United States Patent
Ballard et al.

(10) Patent No.: US 7,200,555 B1
(45) Date of Patent: Apr. 3, 2007

(54) SPEECH RECOGNITION CORRECTION FOR DEVICES HAVING LIMITED OR NO DISPLAY

(75) Inventors: Barbara E. Ballard, Kansas City, MO (US); James R. Lewis, Delray Beach, FL (US); Kerry A. Ortega, Raleigh, NC (US); Ronald E. Van Buskirk, Louisville, CO (US); Huifang Wang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 672 days.

(21) Appl. No.: 09/610,061

(22) Filed: Jul. 5, 2000

(51) Int. Cl.
 *G10L 15/26* (2006.01)
(52) U.S. Cl. ..................... 704/235; 704/275
(58) Field of Classification Search ............... 704/270, 704/235, 276, 275
 See application file for complete search history.

(56) References Cited

U.S. PATENT DOCUMENTS

| | | | | |
|---|---|---|---|---|
| 5,761,687 A | * | 6/1998 | Hon et al. | 715/531 |
| 5,799,273 A | * | 8/1998 | Mitchell et al. | 704/235 |
| 5,855,000 A | | 12/1998 | Waibel et al. | 704/235 |
| 5,864,805 A | | 1/1999 | Chen et al. | 704/235 |
| 5,909,667 A | * | 6/1999 | Leontiades et al. | 704/275 |
| 5,970,460 A | * | 10/1999 | Bunce et al. | 704/278 |
| 6,064,959 A | * | 5/2000 | Young et al. | 704/251 |
| 6,125,347 A | * | 9/2000 | Cote et al. | 704/275 |
| 6,219,638 B1 | | 4/2001 | Padmanabhan et al. | 704/235 |
| 6,314,397 B1 | * | 11/2001 | Lewis et al. | 704/235 |

FOREIGN PATENT DOCUMENTS

| | | |
|---|---|---|
| EP | 0582340 | 7/1993 |
| EP | 0785540 | 7/1997 |

OTHER PUBLICATIONS

Stifelman, L. J., A Tool to Support Speech and Non-Speech Audio Feedback Generation in Audio Interfaces, *Symposium on User Interface Software and Technology*, pp. 171-179, (Nov. 14-17, 1995).

* cited by examiner

*Primary Examiner*—Michael N. Opsasnick
(74) *Attorney, Agent, or Firm*—Akerman Senterfitt

(57) ABSTRACT

A novel apparatus and method for correcting speech recognized text in a predominantly speech-only environment for use with a device having only a limited or no display device available. The method is preferably implemented by a machine readable storage mechanism having stored thereon a computer program, the method comprising the following steps. First, audio speech input can be received and speech-to-text converted to speech recognized text. Second, a first speech correction command for performing a correction operation on speech recognized text stored in a text buffer can be detected in the speech recognized text. Third, if a speech correction command is not detected in the speech recognized text, the speech recognized text can be added to the text buffer. Fourth, if a speech command is detected in the speech recognized text, the detected correction speech command can be performed on speech recognized text stored in the text buffer.

16 Claims, 6 Drawing Sheets

SPEECH RECOGNITION CORRECTION FOR DEVICES HAVING LIMITED OR NO DISPLAY

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to speech recognition computer applications, and more specifically to an apparatus and method of correcting strings of text in a predominantly speech-only environment such as dictating a message over a telephone.

2. Description of Related Art

Optimally, when an author prepares an electronic message for an intended recipient, the author enjoys all the conveniences inherent in using a standard QWERTY keyboard and visual monitor. Specifically, the keyboard facilitates efficient entry of the electronic message and the visual monitor provides visual feedback that enables the author of the electronic message to ensure that the electronic message is properly recorded before it is transmitted. Oftentimes however, the author's effective use of either the keyboard or monitor may be inhibited. For example, in the case of a vehicle-based computer, the author's hands and eyes may be occupied while driving the vehicle and thus, a standard QWERTY keyboard may not be available.

Similarly, a QWERTY keyboard may not be available in the use of a "wearable computer". A wearable computer comprises a battery-powered computer system that is worn on a speaker's body, for instance on the speaker's belt, backpack, vest, and the like. Wearable computers are designed for mobile and predominantly hands-free computer operations. Wearable computers typically incorporate a head-mounted display and have means for accepting and processing speech input. However, wearable computers typically do not include a fully operational QWERTY keyboard.

Finally, a traditional alphanumeric keyboard may not be available in the use of a cellular phone, pager, personal digital assistant, or other portable computing device. Specifically, an author may desire to compose an electronic message using a portable computing device even though a QWERTY keyboard may not be included therewith. An example of such circumstance can include creating a pager message for an intended recipient or reciting information for use on a standardized form such as a shipping label or a business-to-business purchase order.

Notwithstanding, modern speech recognition applications can utilize a computer to convert acoustic signals received by a microphone into a workable set of data without the benefit of a QWERTY keyboard. Subsequently, the set of data can be used in a wide variety of other computer programs, including document preparation, data entry, command and control, messaging, and other program applications as well. Thus, speech recognition is a technology well-suited for use in devices not having the benefit of keyboard input and monitor feedback.

Still, effective speech recognition can be a difficult problem, even in traditional computing, due to a wide variety of pronunciations, individual accents, and the various speech characteristics of multiple speakers. Ambient noise also frequently complicates the speech recognition process, as the computer may try to recognize and interpret the background noise as speech. Hence, often, speech recognition systems can misrecognize speech input compelling the speaker to perform a correction of the misrecognized speech.

Typically, in traditional computers, for example a desktop PC, the correction of misrecognized speech can be performed with the assistance of both a visual display and a keyboard. However, correction of misrecognized speech in a device having limited or no display can prove complicated if not unworkable. Consequently, a need exists for a correction method for speech recognition applications operating in devices having limited or no display. Such a system could have particular utility in the context of a speech recognition system used to dictate e-mail, telephonic, and other messages on devices having only a limited or no display channel.

BRIEF SUMMARY OF THE INVENTION

A method and apparatus for speech recognition correction is provided for devices having a limited or no display channel. The method is preferably implemented by a machine readable storage mechanism having stored thereon a computer program, the method comprising the following steps. First, audio speech input can be received and speech-to-text converted to speech recognized text. Second, a first speech correction command for performing a correction operation on speech recognized text stored in a text buffer can be detected in the speech recognized text. Third, if a speech correction command is not detected in the speech recognized text, the speech recognized text can be added to the text buffer. Fourth, if a speech command is detected in the speech recognized text, the detected correction speech command can be performed on speech recognized text stored in the text buffer.

Notably, the receiving step can further comprise the step of audibly confirming the speech-to-text conversion of the speech recognized text. The step of audibly confirming the speech-to-text conversion of the speech recognized text can comprise audibly playing back the recorded speech recognized text so that it can be determined if the recorded speech recognized text had been misrecognized in the converting step.

The first speech correction command can indicate a preference to terminate the speech correction method. Responsive to detecting this type of first speech correction command in the speech recognized text, it can be determined if the speech recognized text stored in the text buffer had been spelled out. If the speech recognized text stored in the text buffer had been spelled out, the speech recognized text can be added to a speech recognition vocabulary of speech recognizable words. Subsequently, the speech correction method can be terminated.

The first speech correction command can further indicate a preference to correct misrecognized text in the text buffer. Responsive to detecting this type of first speech correction command in the speech recognized text, a list of speech correction candidates can be audibly played back, wherein each speech correction candidate in the list is statistically alternative recognized text to the audio speech input. Subsequently, a selection of one of the speech correction candidates in the list can be received; and, the misrecognized text in the text buffer can be replaced with the selected speech correction candidate.

Instead of receiving a selection, a second speech correction command can be received indicating both preferred replacement text and a preference to replace the misrecognized text with the preferred replacement text in the text buffer. Responsive to receiving such second speech correction command, the misrecognized text in the text buffer can be replaced with the preferred replacement text. Additionally, the second speech correction command can indicate a preference to replace the misrecognized text in the text buffer with spelled-out replacement text. Responsive to receiving such second speech correction command, audibly spelled-out replacement text can be accepted, the audibly spelled-out replacement text comprising a series of spoken alphanumeric characters. The series of spoken alphanumeric characters can be speech-to-text converted and each speech-to-text converted alphanumeric character stored in a temporary buffer. The speech-to-text converted alphanumeric characters can be combined into spelled out replacement text and the misrecognized text in the text buffer can be replaced with the spelled out replacement text. In the preferred embodiment, prior to accepting audibly spelled out replacement text, a pre-stored set of instructions for providing the spelled out replacement text can be audibly played.

Notably, a third speech correction command can be detected in the audibly spelled-out replacement text. The third speech correction command can indicate a preference to delete a particular alphanumeric character stored in the temporary buffer. Responsive to detecting such third speech correction command, the particular alphanumeric character can be deleted from the temporary buffer. Additionally, the third speech correction command can indicate both a preferred replacement alphanumeric character and a preference to replace a particular alphanumeric character with the preferred replacement alphanumeric character in the temporary buffer. Responsive to detecting such third speech correction command, the particular alphanumeric character can be replaced with the preferred alphanumeric character in the temporary buffer.

The foregoing and other objects, advantages, and aspects of the present invention will become apparent from the following description. In the description, reference is made to the accompanying drawings which form a part hereof, and in which there is shown, by way of illustration, a preferred embodiment of the present invention. Such embodiment does not necessarily represent the full scope of the invention, however, and reference must also be made to the claims herein for properly interpreting the scope of this invention.

DETAILED DESCRIPTION OF THE INVENTION

The present invention is an apparatus and method of correcting misrecognized speech in a speech recognition application operating in a computer device having limited or no display. To compensate for the limited keyboard input and display output capabilities of the computer device, the method of the invention can provide audio feedback to a speaker to facilitate the speaker's identification of misrecognition errors. Additionally, the method of the invention can provide speech command and control functionality for correcting misrecognitions. Such functionality can include "Delete" and "Replace" speech commands. Moreover, such functionality can include a "Spell Word"function for providing to the speech recognition application an exact spelling of a misrecognized word.

Figure 1:
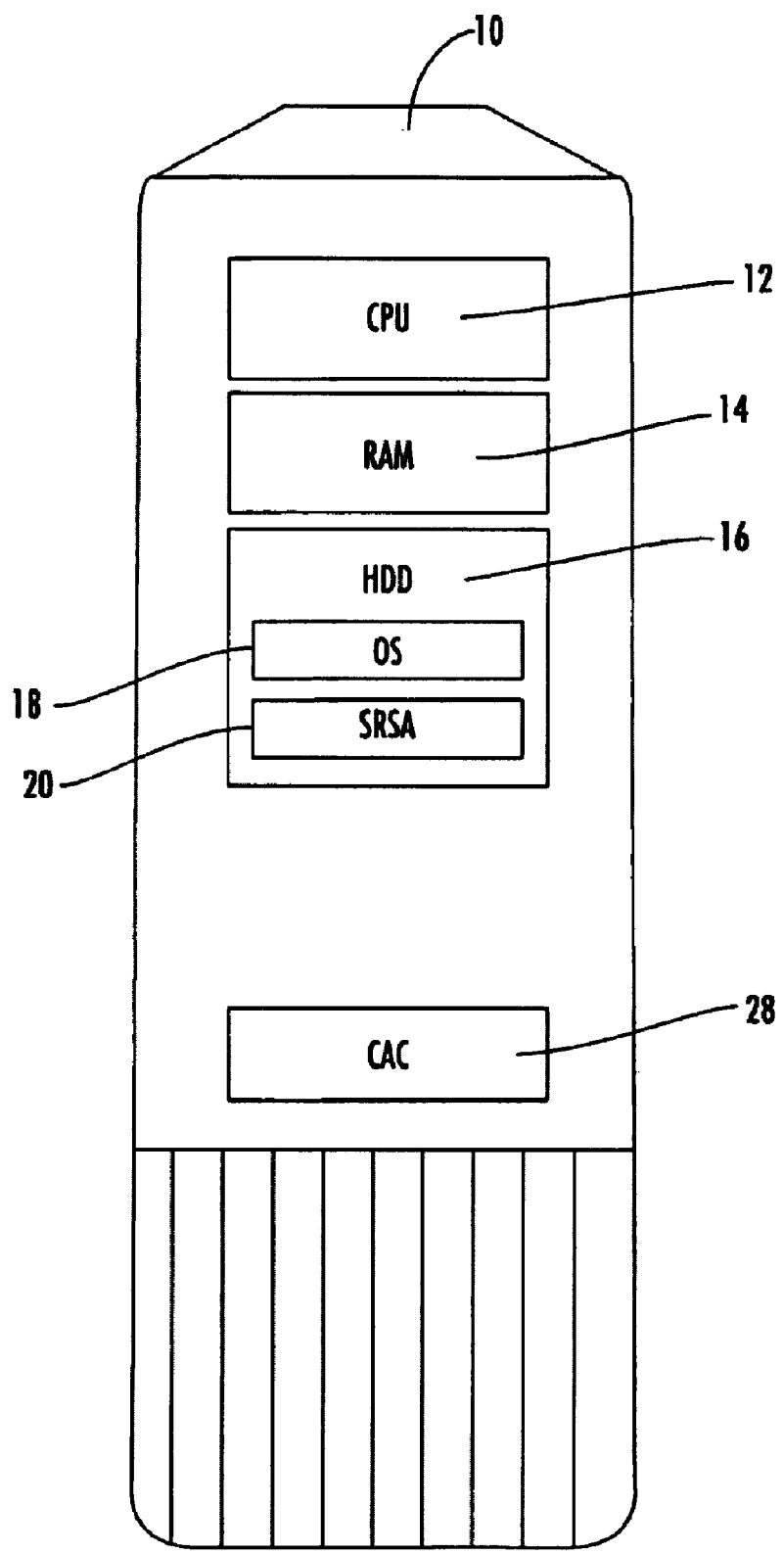
FIG. 1 illustrates a computer apparatus by which the method of the present invention may be practiced.

FIG. 1 illustrates a computer device 10 having limited or no display by which the method of the present invention may be practiced. The computer device 10 can be embedded in a vehicle for instance the computer device can be incorporated in a vehicle navigation system. Alternatively, the computer device 10 can be included as part of a portable computing device or wearable computer. Finally, the computer device 10 can be included in a telephony system. Still, the invention is not limited in regard to the form or use of the computer device 10. Rather, the spirit and scope of the invention includes all computer devices having a limited or no display and computers devices whose use results in a limited or no display.

The computer device 10 preferably includes a central processing unit (CPU) 12, an internal memory device 14 such as a random access memory (RAM), and a fixed storage media 16 such as flash memory or a hard disk drive. The fixed storage media 16 stores therein an Operating System 18 and a Speech Recognition Application 20 by which the method of the present invention can be practiced. Computer audio circuitry (CAC) 28 is also preferred and can be included in the computer device 10 so as to provide an audio processing capability to the computer device 10. As such, audio input means 6, for example a microphone, and audio output means, for example a speaker 8, can be provided both to receive audio input signals for processing in the computer audio circuitry 28 and to provide audio output signals processed by the computer audio circuitry 28. Notably, where the computer device 10 is included as part of a telephony system, the audio input means 6 and audio output means 8 can be included in a telephone handset used by a speaker to communicate with the telephony system.

Optionally, the computer device 10 can additionally include a keyboard (not shown) and at least one speaker interface display unit such as a VDT (not shown) operatively connected thereto for the purpose of interacting with the computer device 10. However, the invention is not limited in this regard and the computer 10 requires neither a keyboard or a VDT in order to suitably operate according to the inventive arrangements. In fact, the method of the invention is intended to provide a speech correction capability to devices having limited or no display and no keyboard. Hence, in the preferred embodiment, the computer device 10 does not include either a keyboard or VDT.

Figure 2:
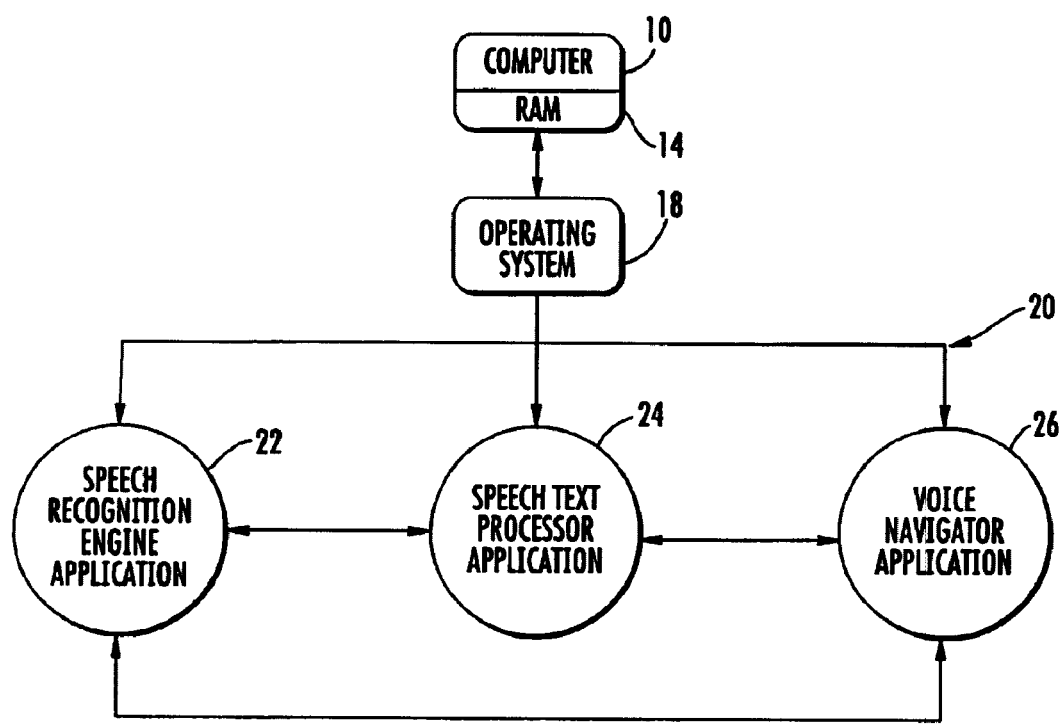
FIG. 2 is a block diagram showing a typical high-level computer architecture for use with the computer apparatus of FIG. 1.

FIG. 2 illustrates a preferred architecture for the computer device 10 of FIG. 1. As shown in both FIGS. 1 and 2, the Operating System 18 can be stored in fixed storage 16. The Operating System 18 is preferably an embedded operating system, for example QNX Neutrino® or Wind River System's VxWorks®. The operating system 18 is not limited in this regard, however, and the invention can also be used with any other type of computer operating system, for example WindowsCE® or WindowsNT® which are available from Microsoft Corporation of Redmond, Wash.

In addition, the Speech Recognition Application 20 can be stored in fixed storage 16. Preferably, the Speech Recognition Application 20 comprises a Speech Recognition Engine 22, a Speech Synthesis Engine 24 and a Speech Correction Application 26 in accordance with the inventive arrangements. Although separate application programs for the Speech Recognition Application 20 are shown in FIG. 2, the invention is not intended to be limited in this regard, and these various applications can be implemented as a more complex, single computer application program as well.

During bootstrap of the computer device 10, the Operating System 18 can be loaded into the internal memory device 14 and executed. Subsequently, the Operating System 18 can load the Speech Recognition Application 20 of the present invention into the internal memory device 14. Upon loading, the Speech Recognition Application 20 can execute in the internal memory device 14. Specifically, the Speech Recognition Application 20 can contain a plurality of code sections for performing speech recognition, speech synthesis and the correction method of the invention. Each code section can include instructions executable by the CPU 12. Upon execution, the CPU 12 can load and execute instructions contained in the Speech Recognition Application in order to perform the method of the invention.

In operation, analog audio input signals are received in the microphone 6 operatively connected to the computer audio circuitry 28 in the computer device 10. The analog audio input signals can be converted to digital audio data by the computer audio circuitry 28 and communicated to the computer device 10 across a communications bus (not shown). Subsequently, the digital audio data can be made available to the Operating System 18 which conventionally can provide the same to the Speech Recognition Engine 22 in order to have performed thereon speech recognition functions typically performed by speech recognition engines well-known in the art.

During a speech dictation session in which a speaker provides dictated speech to the computer device 10, the computer audio circuitry 28 can convert analog audio signals representative of the dictated speech to digital audio data. In the preferred embodiment, the analog audio signal can be transformed into the digital audio data by sampling the analog audio signal at a fixed sampling rate such as every 10–20 milliseconds. Ultimately the digital audio data can be communicated to the Speech Recognition Engine 22. The Speech Recognition Engine 22 can perform speech-to-text conversion of the speaker's speech using speech-to-text conversion techniques well-known in the art. Specifically, as with conventional speech recognition systems, the digital audio data can be processed by the Speech Recognition Engine 22 in order to identify spoken words and phrases represented in the digital audio data.

As in typical speech recognition systems, the Speech Recognition Engine 22 on occasion can misrecognize speech. That is, although a speaker may have dictated one word, the Speech Recognition Engine 22 can convert the word to text not representative of the dictated word. For example, although the speaker may have dictated the word "milk", the Speech Recognition Engine 22 can convert the dictated word "milk" to the text "mill". Without adequate visual feedback, however, the speaker cannot know that the Speech Recognition Engine 22 misrecognized the dictated word.

To compensate for the lack of visual feedback to the speaker resulting from the limited display of the computer device 10, the present invention can provide audio feedback using the Speech Synthesis Engine 24. Specifically, upon performing text-to-speech conversion in the Speech Recognition Engine 22, the Speech Synthesis Engine 24, using text-to-speech (TTS) techniques well-known in the art, can play back to the speaker the resulting text. In consequence, the speaker can identify when dictated text has been misrecognized.

When a misrecognition becomes apparent by way of the audio feedback provided to the speaker by the Speech Synthesis Engine 24, the speaker can correct the misrecognized text using the Speech Correction Application 26 in accordance with the inventive arrangements. The Speech Correction Application 26 as disclosed herein can be implemented as a computer program by a programmer using commercially available development tools for the chosen Operating System 18 by reference to the flow charts illustrated in FIGS. 3–6, which collectively represent an inventive embodiment of the Speech Correction Application 26. In the preferred embodiment, a speaker can dictate speech in a computer device having limited or no display and can subsequently review text converted from the dictated speech and correct misrecognitions contained therein. In the preferred embodiment, the computer device having limited or no display is a telephony system in which a speaker can interact with the computer device through a telephone handset.

Figure 3:
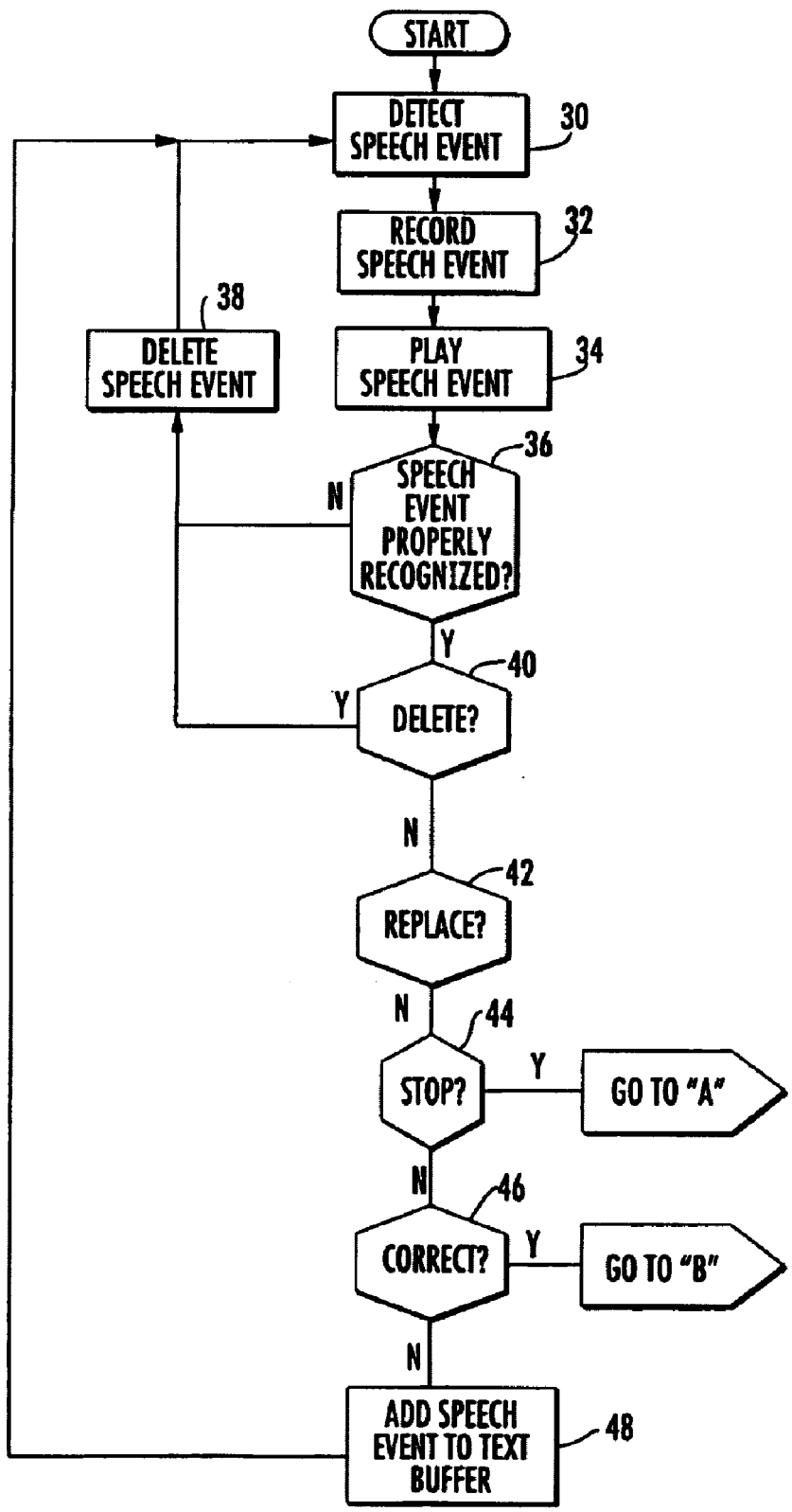
FIG. 3 is a flowchart illustrating a method for dictating a body of text according to the present invention.

Referring specifically to FIG. 3, the method preferably begins in a conventional manner by communicatively connecting a speaker to the computer device 10. Specifically, the connection can be initiated by actuating a push-button on a hand-held device or by voice activation of a telephony system through a magnetic velocity server having therein a telepathy card. In particular, the magnetic velocity server is a device well-known in the art and can be used to communicatively connect a plurality of phone lines each phone line having a respective speaker. Once connected, the speaker can provide audio input through the magnetic velocity server to the computer device 10 and can receive audio output through the magnetic velocity server from the computer device 10.

The method to be described herein can operate over a single or plurality of auditory speech events received in the Speech Recognition Engine 22, each speech event comprising any of a plurality of alphanumeric characters, words, phrases, sentences, or combinations thereof. Using conventional techniques, the Speech Recognition Engine 22 can be programmed to detect an auditory speech event at step 30, preferably by sampling the audio input device 6 at a pre-defined fixed sampling rate as discussed above. The sampling window can be automatically terminated by programming the method to temporarily stop listening for a speech event after a pre-determined period of time of non-acoustic signals (i.e., after a delay of time in which no speech event occurs, such as a prolonged amount of silence), or by actuation of the same or a different push-button, or by any other alternative scheme known to those skilled in the art.

After detecting an auditory speech event at step 30, the speech event can be processed by the Speech Recognition Engine 22 in order to convert the speech event to speech recognized text. Subsequently, the speech recognized text can be recorded in a temporary memory buffer in the internal memory device 14 of the computer device 10 at step 32. In step 34, the speech recognized text can be processed by the Speech Synthesis Engine 24 in order to play back to the speaker the speech recognized text contained in the temporary memory buffer. The Speech Synthesis Engine 24 can play back the speech recognized text to the speaker using a system-generated voice that is preferably communicated through the audio output device 8 that, in the case of a telephony system, is operatively connected to the speaker's audio input device 6. Step 34 thus permits the speaker to ascertain whether the speech event was properly recognized when it was recorded in step 32.

In step 34, as elsewhere in this method, the Speech Synthesis System 24 preferably can discriminate between homonyms such as "to," "too," and "two" by audibly spelling the subject word to the speaker. Moreover, speaker comprehension of the play back consisting of individual letters can be improved with conventional playback techniques such as programming the Speech Synthesis System 24 to represent the letter "A" by the word "Alpha" during play back, or to recite "A as in Apple" for any necessary clarification.

If the speech event was not properly recognized, control passes from step 36 to step 38, in which case the misrecognized text can be deleted from the temporary memory buffer in which it was recorded. If, on the other hand, the speech event was properly recognized, control passes from step 36 to step 40 wherein the speech recognized text can be reviewed by the Speech Correction Application 26 to determine whether the speech recognized text includes therein a speech correction command, as preferably indicated by a preferred keyword, as will be elaborated upon presently.

In steps 40–46, the Speech Correction Application 26 can detect a preferred keyword in the speech recognized text. Each preferred keyword can be a speech correction command used to indicate the speaker's intention to correct speech recognized text stored in the buffer. In a preferred embodiment, there are four preferred keywords, listed without regard to a particular order: DELETE, REPLACE, STOP and CORRECT. For the purposes of this specification, these four keywords will be used throughout this description. It should be understood, however, that other preferred keywords or phrases can be similarly implemented, such as SCRATCH THAT, by other words or phrases that are intended to be readily discernable from the actual content of the speech event per se, preferably comprising words or phrases that are not likely to be spoken by a speaker dictating a speech event.

The discrete plurality of preferred keywords can not be dictated by the speaker without directing the computer device 10 to perform the specified commands associated therewith. This description, however, is not intended to be limiting in this regard, as alternative listening techniques are also hereby contemplated, such as, for example, dictating SCRATCH, followed by allowing the sampling window to expire, followed again by dictating THAT, or alternatively using an attention word such as COMPUTER, SCRATCH THAT in order to signal the computer device 10 to perform the indicated speech correction command instead of storing the subsequent speech event in the text buffer of the internal memory 14 of the computer device 10, as will be discussed in reference to step 48.

While the speech recognized text of the speech event is being screened for the presence of a preferred keyword, namely, checking for the word DELETE in step 40, REPLACE in step 42, STOP in step 44, and CORRECT in step 46, there are five possible scenarios for speech input and playback following a properly recognized speech event. Specifically, the speech event may be added to a text buffer in step 48, or alternatively, one of the four noted commands, as triggered by the appropriate preferred keyword, may be executed, as related to a previously recorded speech event that was stored in the text buffer. Each of these five cases will now be described in greater detail.

Case 1: Add Speech Event to Text Buffer

After an input device signifies an open period for speech input during a sampling window, a speech event comprising a message can be dictated. For example, suppose that an initial speech event to be dictated and recorded comprises the message, "Stop on your way home to buy milk." When prompted, the speaker thus either recites the full message or dictates it in a plurality of message segments. Assuming the latter case for discussion purposes, the initial dictation might be, "Stop on your way home," in which case this first message segment is detected in step 30, recorded in step 32, and then played back to the speaker in step 34 for determination of whether it was properly recognized by the system. Assuming proper recognition, control bypasses steps 40–46 of FIG. 3 since no underlying speech correction command was requested by way of recitation of a preferred keyword. At step 48 then, the first message segment is added to a text buffer in the internal memory device 14 or other memory device, and the Speech Correction Application 26 returns to step 30 to continue listening for a subsequent speech event.

When prompted for a subsequent speech input, the speaker may dictate, in accordance with the previous hypothetical, the second message segment, namely "to buy milk." As the method of this invention repeats, this second message segment is detected at step 30, recorded in step 32, and then played back to the speaker in step 34, as previously discussed in reference to the first message segment. In step 34 however, only the most recent speech event is preferably recited, i.e., "to buy milk." Assuming proper software recognition of the second speech event at step 36, the software again progresses through steps 40–46 of FIG. 3 as no underlying command was requested by way of recitation of a preferred keyword. At step 48 then, this second message segment is added to the text buffer following the first message segment, the two segments now forming the composite desired textual message, "Stop on your way home to buy milk."

Those skilled in the art will understand that the dictated message may be provided by the speaker in one or more speech events as described. As suggested above, when multiple speech events are used to create a message, the individual speech segments are preferably merged sequentially in the text buffer at step 48 in order to complete the entire message for recordation. Once the entire message has been successfully dictated, the STOP command can be used to exit the dictation phase of the method, ultimately enabling a desired transmission of the electronic message. The STOP command will be explained more fully in reference to Case 4 below.

Case 2: DELETE Command

Returning to the former example, assume that the speaker has misdictated the first message segment as "Stop on your way to work" as opposed to the desired recitation, "Stop on your way home." In this case, after the Speech Synthesis System 24 performs a play back of the speech recognized text in step 34, the speaker can hear the misdictation, even though the speech event was indeed properly recognized by the Speech Recognition Engine 22. Accordingly, assume that the speaker desires to remove the misdictation using the DELETE command. More specifically, assume that the speaker recites "DELETE" to direct removal of the last addition to the temporary memory buffer following proper speech recognition of a speech event in step 36. Alternatively, the speaker could recite "DELETE" immediately followed by the misdictated phrase, "Stop on your way to work." Regardless, in step 34, the speech event is played back to the speaker, irrespective of whether it was the DELETE command alone or the DELETE command along with the misdictated message. Assuming then proper speech recognition in step 36, in step 40, the DELETE command is detected and the method transitions to step 38 in which case the speech event is deleted from the text buffer into which it initially had been placed and stored. Thereafter, the method can transition back to step 30 wherein the method can resume listening for the next speech event.

Case 3: REPLACE Command

Continuing with the example from Case 2, assume that the speaker properly re-dictates the first message segment correctly indicating "Stop on your way home," which is successfully added to the text buffer in step 48. Assume further that after the next speech event detection in step 30, the second message segment is misdictated as "To buy juice" as opposed to the desired recitation, "To buy milk." After step 34, the speaker hears the misdictation, even though the speech event was indeed properly recognized in the next step, i.e. step 36. However, as the Speech Correction Application 26 transitions back to step 30, the speaker desires to delete the misdictated speech event and replace it with the proper message segment in a single step, as opposed to the multi-step approach discussed in Case 2 (i.e., first, removing the misdictated text using the DELETE command, and subsequently inputting the corrected message in place thereof).

More specifically, after the misdictation is detected, the subsequent recitation "REPLACE to buy milk" is detected at step 30. Again, this speech event is recorded in step 32 and played back to the speaker in step 34 in order to confirm that the command was properly recognized in accordance with step 36. Assuming proper recognition of the subsequent recitation, the Speech Correction Application 26 then detects the REPLACE command in step 42 due to the first word of the spoken input, causing a transition to a new set of instructions. Here, the last input to the text buffer, i.e., the misdictation "to buy juice" is replaced with the replacement message segment immediately following the command keyword REPLACE. Thus, the corrected phrase "To buy milk" is caused to replace the misdictated phrase "To buy juice" within a single step. In step 34, the Speech Synthesis Engine 24 again plays the replacement text for the speaker's verification of its accuracy. Assuming proper recognition of the replacement text in step 36, the text buffer in step 48 is now made to include the corrected message, comprising the aggregated message "Stop on your way home to buy milk."

Case 4: STOP Command

Before or after a desired message has been successfully added to the text buffer in step 48, a STOP command can be used to preferably exit the Speech Correction Application 26 at step 44. Determining that a desired message is correctly stored in the text buffer is done in an iterative manner by the speaker's verification that each intended speech segment matches with the corresponding play back. Once this determination has been made, such as at the end of the example in Case 3, the speaker can recite the STOP command, which is, as previously described, played back to the speaker at step 34. Again, assuming proper recognition of this command at step 36, the Speech Correction Application 26 detects the STOP command at step 44, whereupon control passes to process "A" shown in step 50 of FIG. 4.

Figure 4:
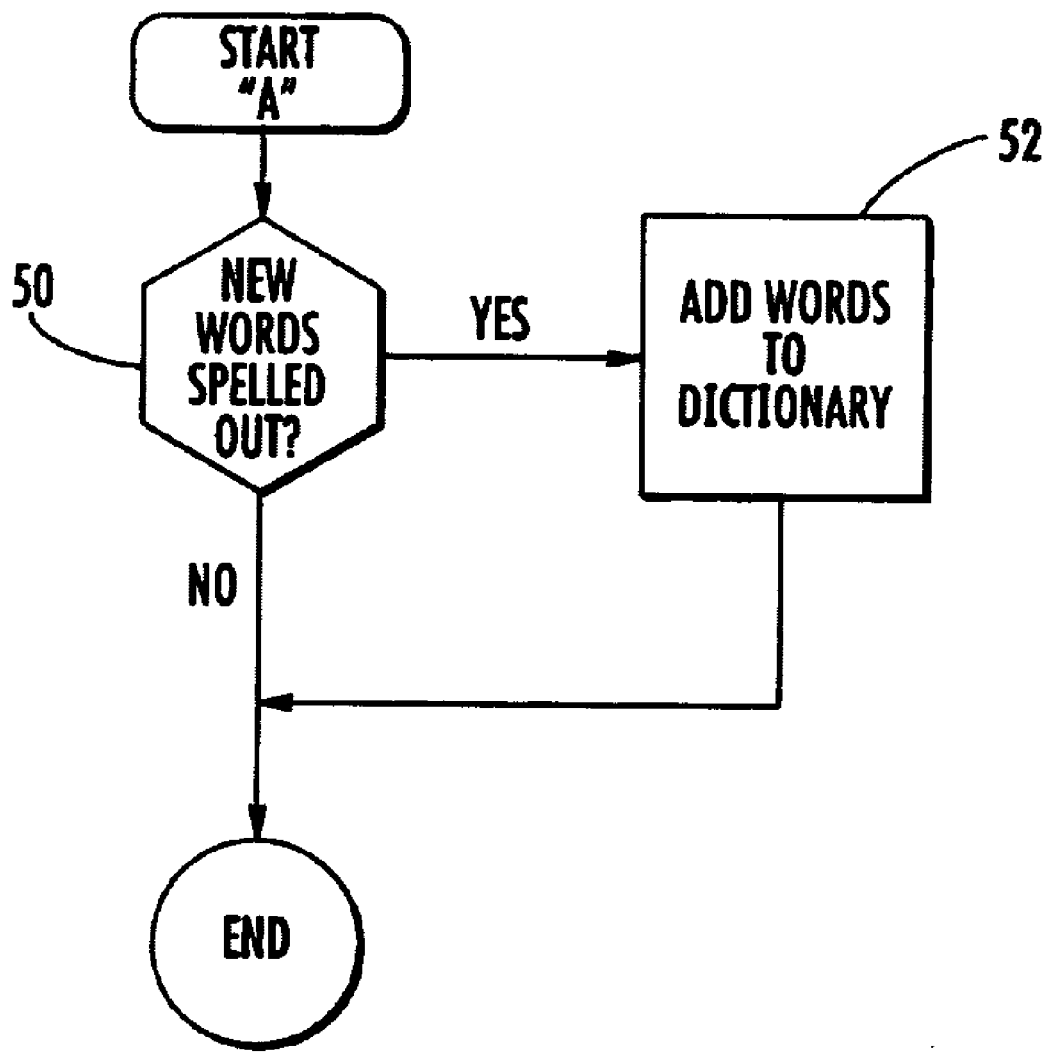
FIG. 4 is a flowchart illustrating a method for implementing the STOP command of FIG. 3.

Turning now to FIG. 4, step 50 is preferably used to determine whether new words have been added in the pending dictation. Here, "new" words comprise words that are in the pending dictation but are not found in a database of vocabulary words preferably maintained by the Speech Recognition Engine 22. If new words are to be included in the vocabulary, they can be added using a "spell-out" procedure, which is part of a process to be discussed in reference to Case 5 below.

The detection of a new word is preferably accomplished by setting a flag associated with a new word once it is added to the pending dictation through the spell-out process. Alternatively, the words in the pending dictation may be cross-checked against the database of vocabulary in order to define new words, since any word in the dictation which is not found in the vocabulary is new. Other conventional techniques for new word recognition may also be implemented, as understood by those in the art of speech recognition.

If new words have been spelled-out in accordance with step 50, they are preferably added to the software vocabulary in step 52 for use in future dictation sessions. If, on the other hand, no new words are detected in step 50, or after the new words are added to the software vocabulary in step 52, the method of present invention ends, as indicated in FIG. 4, thereby signifying successful completion of the dictation session. Thereafter, conventional techniques may be implemented to process the successfully dictated electronic message.

Case 5: CORRECT Command

Returning to FIG. 3 and the previous hypothetical dictation session, assume that the first message segment was correctly dictated and recognized so that the phrase "Stop on your way home" has been successfully added to the text buffer in step 48. Assume that during dictation of the subsequent message segment, the speaker mispronounced the last word "milk" such that the "k" sound was missing and as a result, the software playback in step 34 recites "To buy mill" instead of the desired recitation, "To buy milk." Rather than using a DELETE or REPLACE command, the speaker instead elects to use the CORRECT command.

More specifically, assume that the speaker recites the command "CORRECT mill" as part of a subsequent speech event following a first speech event needing correction. In step 34 then, the speaker's command is played back to the speaker in order to confirm proper speech recognition, and assuming proper speech recognition at step 36, the speaker can issue the CORRECT speech correction command. Subsequently, the Speech Correction Application 26 detects the CORRECT command in step 46. Thereafter, control passes to process "B" of step 54 in FIG. 5.

Figure 5:
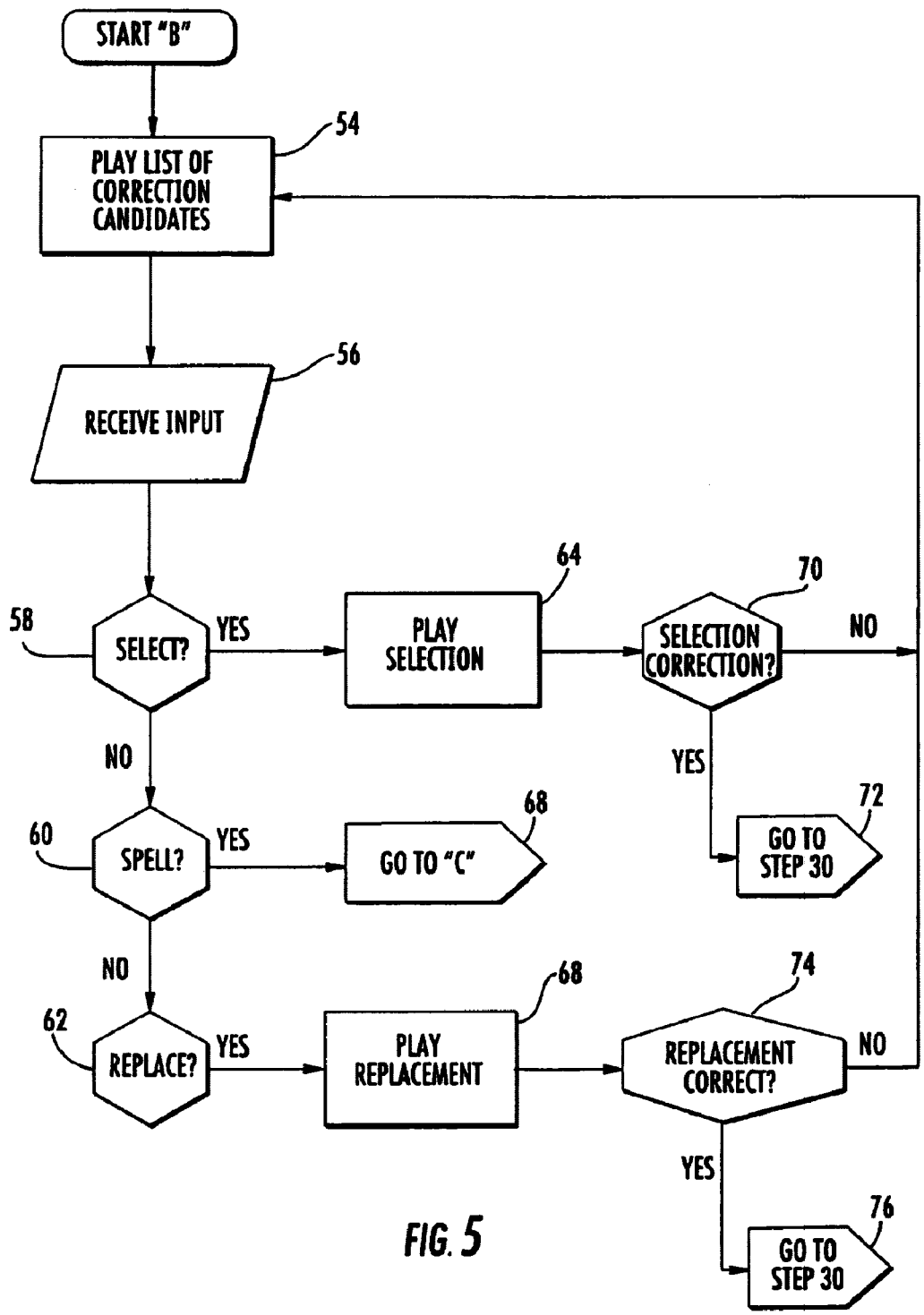
FIG. 5 is a flowchart illustrating a method for implementing the CORRECT command of FIG. 3.
Figure 6:
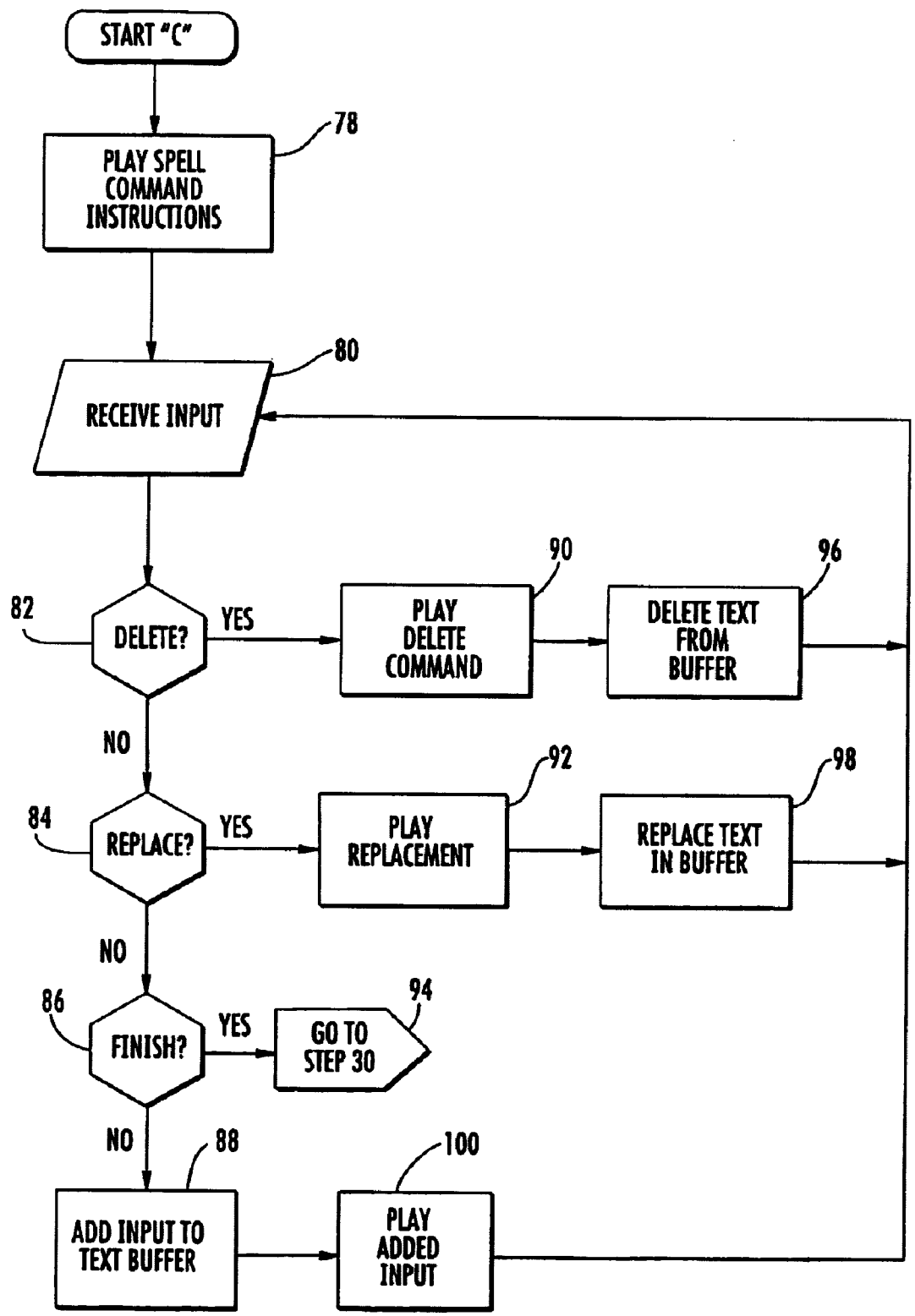
FIG. 6 is a flowchart illustrating a method for implementing the SPELL command of FIG. 5.

Turning now to FIG. 5, in step 54, the Speech Correction Application 26 can audibly play back to the speaker a list of "correction candidates", i.e. a list of letters, words, or phrases that are close in pronunciation or spelling to the respective letter, word, or phrase selected for correction, as conventionally determined by the Speech Recognition Engine 22. In the present hypothetical example, the word "mill" has been selected for correction. Accordingly, the list of correction candidates could comprise words which are close in pronunciation or spelling to "mill." Moreover, each element on the candidate list may include an identifier, such as a number, to facilitate the speaker's selection of the desired correction. For example, in this hypothetical case, the candidate list could comprise "1. milk; 2. meal; 3. mark".

The list of correction candidates can be conventionally generated in any manner well known to those skilled in the art. For example, when the speaker dictates the subject message "To buy milk", the Speech Recognition Engine 22 in performing conventional speech recognition on the subject message creates and considers a list of potential candidates for each word in the recitation. Subsequently, the Speech Recognition Engine 22 selects the statistically most likely candidate for each word in order to provide an accurate speech-to-text conversion of each word. The list of candidate corrections from which the word "mill" can be selected is also the candidate list to be utilized in step 60, as will be elaborated upon below.

While the Speech Synthesis Engine 24 audibly plays the list of correction candidates for "mill" in step 54, the Speech Recognition Engine 22 in coordination with the Speech Correction Application 26 can detect a simultaneously speech event such as the speaker's selection of a correct candidate from the list of correction candidates, using techniques well known in the art. For example, "barge-in" technology allows voice recognition software to both speak and listen simultaneously, and the speaker can "barge in" either verbally or by actuating a push-button.

The speaker's barge-in or other input is received in step 56, and control passes to steps 58–62 whereupon the speaker may enumerate one of three speech correction commands, preferably SELECT, SPELL, or REPLACE, listed here in no particular order. The processes accomplished by each of these three speech correction commands will be separately discussed below.

Case 5A: SELECT Command

Returning to the hypothetical dictation session of Case 5, recall that the first message segment was correctly dictated and recognized so that the phrase "Stop on your way home" was correctly added to the text buffer in step 48. Recall also that during dictation of the second speech segment, the speaker mispronounced the word "milk" resulting in adding the message segment "to buy mill" into the temporary memory buffer. Then, recall further that the speaker recited "CORRECT mill" in the next speech event, whereupon the Speech Synthesis Engine 24 audibly played a list of correction candidates for "mill" in step 54.

Within the CORRECT command context, a SELECT command can be the keyword input received at step 56. If so, the SELECT command is most beneficial when the candidate list already includes the desired correction. For example, if the candidate list for "mill" read: 1. milk; 2. meal; 3. mark, etc., the speaker would hear the desired correction as the second choice in the playback of step 54. The speaker would therefore recite "SELECT one," which would be recognized by the Speech Recognition Engine 22 and subsequently processed by the Speech Correction Application 26.

Because the Speech Recognition Engine 22 produces text from the speaker's speech input, the SELECT command can be recognized at step 58. The resulting transition to step 64 causes the audible playback of selection number two from the candidate list, i.e., the desired word "milk." If the selection sounds confusingly similar to other potential choices from the candidate list, the Speech Correction Application 26 may optionally cause the Speech Synthesis Engine 24 to spell out the selected correction, although that is not the case in this hypothetical and is not depicted in the figure.

In step 70, the Speech Correction Application 26 causes the Speech Synthesis Engine 24 to audibly ask the speaker to confirm whether or not the selection played in step 64 was correct or satisfactory. If the speaker responds "no," then the Speech Correction Application 26 returns to step 54 in order to begin replaying the candidate list for "mill," presenting an additional correction opportunity to the speaker.

If, on the other hand, the speaker responds "yes" to the step 70 inquiry, then the speaker's selection "milk" replaces the subject word for correction, i.e., "mill." Additionally, if the selection is correct, control passes from step 70 back to step 30 of FIG. 3, as the desired dictation has now been successfully added to the text buffer. From this point, the speaker may exit the Speech Correction Application 26 as previously discussed using the STOP command. Alternatively, the speaker may dictate additional text and commands, in accordance with the methodology of the present invention.

Case 5B: REPLACE Command

A REPLACE command is preferably used when the candidate list for the subject word or phrase does not include the desired correction, but the speaker knows or believes that the vocabulary includes the desired correction. In terms of the example from Case 5A, this could mean that the candidate list for "mill" would not include the word "milk." However, assuming the speaker knows or believes that the word "milk" is within the vocabulary, the speaker could recite "REPLACE milk," and this would be the input received at step 56.

Accordingly, in step 62, the software would detect the REPLACE speech correction command, having been conventionally converted to text by the Speech Recognition Engine 22 as previously discussed. The resulting transition to step 68 causes the Speech Synthesis Engine 24 to audibly play back the desired word "milk," assuming the word "milk" is indeed found within the speech recognition vocabulary. If not, a default audio message can preferably be communicated by the Speech Correction Application 26.

In step 74, the Speech Correction Application 26 can cause the Speech Synthesis Engine 24 to ask the speaker to confirm whether or not the replacement played in step 68 was correct. If the speaker responds "yes," then the speaker's replacement "milk" is exchanged with the subject word for correction, i.e., "mill." Moreover, control then passes from step 74 back to step 30 of FIG. 3, as the desired dictation is now in the text buffer. From this point, the speaker may exit the Speech Correction Application 26 as previously discussed using the STOP command. Alternatively, the speaker may dictate additional text and commands, also as previously discussed.

However, if in step 74 the speaker responds "no," the Speech Correction Application 26 preferably returns to step 54, in which case the candidate list for "mill" is replayed, although use of the SELECT or REPLACE command is probably unlikely to yield the desired correction, the former because the desired selection is not in the candidate list, and the latter due to the prior failure to locate the desired replacement word within the vocabulary. Thus, a SPELL command is a logical choice in this circumstance, as will be elaborated upon presently.

Case 5C: SPELL Command

When the speaker knows, or comes to know, that the desired correction is neither in the subject candidate list nor in the vocabulary, a SPELL command can be employed. For purposes of this discussion, assume that the desired correction "milk" needs to be spelled out because it is not contained on the list of correction candidates. Accordingly, as the speaker then recites "SPELL," the input is received by the Speech Recognition Engine 22 and passed to the Speech Correction Application 26 in step 56. There is no need for the speaker to explicitly recite "SPELL mill" in order to identify "mill" for correction because the word "mill" has already been selected for correction in step 46 of FIG. 3 via the recitation "CORRECT mill." Moreover, explicit recitation of "SPELL milk" would have little significance because "milk" is not in the vocabulary; if it were, then the speaker would preferably have employed either the SELECT or REPLACE command instead of the SPELL command.

The Speech Recognition Engine 22 conventionally produces text from the speaker's audio input, and accordingly, the SPELL command is recognized in step 60. Thereafter, control passes from step 60 to process "C" in FIG. 6, and more particularly, to step 78, by which the spelling correction process can be initiated.

In step 78, the Speech Correction Method 24 in conjunction with the Speech Synthesis Engine 22 can play back the SPELL command, though it may also recite the subject letter, word, or phrase for correction. Here, the word "mill" was identified for correction in step 46. Thus, in this hypothetical, the Speech Correction Application 26 may simply cause the recitation of "SPELL" or "SPELL mill." Also in step 78, the Speech Correction Application 26 may cause the recitation of instructions for the speaker to follow in dictating the spelling correction.

For example, the instructions might direct a speaker to: 1) wait for a software prompt; 2) recite a desired sequence of characters; or 3) maintain a predetermined period of silence in order to indicate to the software that the current spelling session is complete. The instructions could also provide a routine for which the software could be programmed to recognize spacing between words, thereby permitting spelling of sequential words that are separated by spaces. Those skilled in the art will recognize that other conventional instructions can also be implemented at step 78.

After a predetermined software prompt, the speaker's audio speech input is received first by the Speech Recognition Engine 22 and subsequently by the Speech Correction Application 26 in step 80. Preferably, the speech input can comprise one of four possibilities: a series of characters, or a DELETE, REPLACE, or FINISH command. Each of these cases will be discussed below.

Case 5C-1: Character Recitation

Regarding receiving input in step 80, the Speech Recognition Engine 22 preferably receives the speaker's spoken input within a definable listening period. In a preferred embodiment, each listening period begins following a Speech Correction Application 26 induced message that prompts the speaker to speak, while a designated period of silence can terminate the listening period. However, those skilled in the art may implement alternative schemes to define the listening period.

Thus, after a software prompt or other signifies an open period for speech input and such speech input is received in step 80, the speaker spells the intended correction, i.e., the word "milk" in the present example. At the end of the predetermined period of silence, the aforementioned listening period ends. Hence, if no commands are invoked, steps 82–86 can be bypassed in order to reach step 88, whereby the input "milk" is added to the text buffer in place of the previously misdictated word "mill." In step 100 then, a speech synthesized voice produced by the Speech Synthesis Engine 24 can recite the added input "milk" in order to allow the speaker to confirm that the appropriate correction was made. Referring back to step 80, the speaker can alternatively use a FINISH command to exit the spelling correction phase of the Speech Correction Application 26. The FINISH command is fully explained below with reference to Case 5C-4.

Case 5C-2: DELETE Command

Referring to the hypothetical in Case 5C-1, assume that the play back in step 100 reveals that the speaker misspelled the correction or that the Speech Recognition Engine 22 misrecognized the speaker's spelling correction. If so, the speaker can invoke a DELETE command by simply reciting "DELETE" in the next pass through step 80. In step 82 then, the Speech Correction Application 26 can detect the DELETE command and can induce play back of the DELETE command in step 90, confirming that the Speech Recognition Engine 22 appropriately recognized the speaker's speech correction command. In a subsequent step 96, the group of erroneous characters last added to the text buffer is deleted, whereupon the Speech Correction Application 26 can be made to return to step 80 in order to permit the Speech Recognition Engine 22 in coordination with the Speech Correction Application 26 to receive additional audio speech input and thus further permit another opportunity for the speaker to successfully input the word "milk."

Case 5C-3: REPLACE Command

A REPLACE command can be used to delete misspelled text from the text buffer, the text being replaced with a properly spelled text string in a single step, as opposed to the multi-step approach discussed above. Again referring to the hypothetical of Case 5C-1, assume that the audio playback in step 78 revealed that the speaker misspelled the correction, or that the Speech Recognition Engine 22 misrecognized the speaker's spelling correction. Invoking a REPLACE speech correction command then, the speaker can recite "REPLACE milk" in the next pass through step 80. In this case however, the letters "m-i-l-k" are recited to define the replacement spelling. Preferably, the recitation can include a brief pause occurring between the enunciation of each individual letter in order to allow the Speech Recognition Engine 22 to recognize each individual letter.

In step 84 then, the Speech Correction Application 26, in coordination with the Speech Recognition Engine 22, can detect the REPLACE speech correction command, and the REPLACE speech correction command preferably can be played back along with the REPLACE speech correction command and its associated replacement characters in step 92, thereby confirming appropriate speech recognition for the speaker. In step 98 then, the replacement characters are substituted for the group of erroneous characters last added to the text buffer. Subsequently, the Speech Correction Application 26 can return to step 80 permitting the speaker to alternatively exit from the spelling correction process in the Speech Correction Application 26 using the FINISH speech correction command discussed below.

Case 5C-4: FINISH Command

Once a selected textual error has been corrected, as verified by the speaker in any manner discussed above, a FINISH speech correction command can be recited in a subsequent pass through step 80 in order to allow the speaker to exit the spelling correction process via steps 86 and 94. After step 94, control jumps back to step 30 of the main speech input sequence, permitting addition of new text, or termination of the message generation process, as discussed above with respect to the STOP command.

The spirit of the present invention is not limited to any embodiment described above. Without departing from the scope of this invention, other modifications will therefore be apparent to those skilled in the art. Thus, it must be understood that the detailed description of the invention and drawings were intended as illustrative only, and not by way of limitation.

The invention claimed is:

1. A speech correction method for correcting misrecognized text in a speech recognition application comprising the steps of:

receiving audio speech input and speech-to-text converting said received audio speech input to speech recognized text;

audibly confirming said speech-to-text conversion of said speech recognized text, wherein audibly confirming comprises audibly playing back of said speech recognized text using a speech synthesis engine so that it can be determined if said recorded speech recognized text had been misrecognized in said speech-to-text converting step, determining whether a word of said speech recognized text is a homonym, and if so audibly spelling the homonym using said speech synthesis engine;

detecting in said speech recognized text a first speech correction command for performing a correction operation on speech recognized text stored in a text buffer;

if a first speech correction command is not detected in said speech recognized text, adding said speech recognized text to said text buffer; and, if a first speech correction command is detected in said speech recognized text, performing said detected speech correction command on speech recognized text stored in said text buffer.

2. The method according to claim 1, further comprising the step of:

responsive to detecting said first speech correction command in said speech recognized text, said first speech correction command indicating a preference to terminate said speech correction method, determining if said speech recognized text stored in said text buffer had been spelled out;

adding said speech recognized text determined to have been spelled out to a speech recognition vocabulary of speech recognizable words; and, terminating said speech correction method.

3. The method according to claim 1, further comprising the step of:

responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;

receiving a selection of one of said speech correction candidates in said list; and, replacing said misrecognized text in said text buffer with said selected speech correction candidate.

4. A speech correction method for correcting misrecognized text in a speech recognition application, the method comprising the steps of:

receiving audio speech input and speech-to-text converting said received audio speech input to speech recognized text;

detecting in said speech recognized text a first speech correction command for performing a correction operation on speech recognized text stored in a text buffer;

if a first speech correction command is not detected in said speech recognized text, adding said speech recognized text to said text buffer; and, if a first speech correction command is detected in said speech recognized text, performing said detected speech correction command on speech recognized text stored in said text buffer;

responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;

receiving a second speech correction command, said second speech correction command indicating both preferred replacement text and a preference to replace said misrecognized text with said preferred replacement text in said text buffer; and, responsive to receiving said second speech correction command, replacing said misrecognized text in said text buffer with said preferred replacement text.

5. A speech correction method for correcting misrecognized text in a speech recognition application comprising the steps of:

receiving audio speech input and speech-to-text converting said received audio speech input to speech recognized text;

detecting in said speech recognized text a first speech correction command for performing a correction operation on speech recognized text stored in a text buffer;

if a first speech correction command is not detected in said speech recognized text, adding said speech recognized text to said text buffer;

if a first speech correction command is detected in said speech recognized text, performing said detected speech correction command on speech recognized text stored in said text buffer;

responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;

receiving a second speech correction command, said second speech correction command indicating a preference to replace said misrecognized text in said text buffer with spelled-out replacement text;

responsive to receiving said second speech correction command, accepting audibly spelled-out replacement text, said audibly spelled-out replacement text comprising a series of spoken alphanumeric characters;

speech-to-text converting said series of spoken alphanumeric characters, each speech-to-text converted alphanumeric character stored in a temporary buffer, and combining said speech-to-text converted alphanumeric characters into spelled out replacement text; and, replacing said misrecognized text in said text buffer with said spelled out replacement text.

6. The method according to claim 5, further comprising the steps of:

detecting in said audibly spelled-out replacement text, a third speech correction command, said third speech correction command indicating a preference to delete a particular alphanumeric character stored in said temporary buffer; and, responsive to detecting said third speech correction command, deleting said particular alphanumeric character from said temporary buffer.

7. The method according to claim 5, further comprising the steps of:

detecting in said audibly spelled-out replacement text, a third speech correction command, said third speech correction command indicating both a preferred replacement alphanumeric character and a preference to replace a particular alphanumeric character with said preferred replacement alphanumeric character in said temporary buffer; and, responsive to detecting said third speech correction command, replacing said particular alphanumeric character with said preferred alphanumeric character in said temporary buffer.

8. The method according to claim 5, wherein said accepting step further comprises the step of:
prior to accepting audibly spelled out replacement text, playing a pre-stored set of instructions for providing said spelled out replacement text.

9. A machine readable storage, having stored thereon a computer program having a plurality of code sections for performing a speech correction method for correcting misrecognized text in a speech recognition application, said code sections executable by a machine for causing a machine to perform the steps of:
receiving audio speech input and speech-to-text converting said received audio speech input to speech recognized text;
audibly confirming said speech-to-text conversion of said speech recognized text, wherein audibly confirming comprises playing back of said speech recognized text using a speech synthesis engine so that it can be determined if said recorded speech recognized text had been misrecognized in said speech-to-text converting step, determining whether a word of said speech recognized text is a homonym, and if so audibly spelling the homonym using said speech synthesis engine;
detecting in said speech recognized text a first speech correction command for performing a correction operation on speech recognized text stored in a text buffer;
if a first speech correction command is not detected in said speech recognized text, adding said speech recognized text to said text buffer; and,
if a first speech correction command is detected in said speech recognized text, performing said detected speech correction command on speech recognized text stored in said text buffer.

10. The machine readable storage according to claim 9, further comprising the step of:
responsive to detecting said first speech correction command in said speech recognized text, said first speech correction command indicating a preference to terminate said speech correction method, determining if said speech recognized text stored in said text buffer had been spelled out;
adding said speech recognized text determined to have been spelled out to a speech recognition vocabulary of speech recognizable words; and,
terminating said speech correction method.

11. The machine readable storage according to claim 9, further comprising the step of:
responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;
receiving a selection of one of said speech correction candidates in said list; and,
replacing said misrecognized text in said text buffer with said selected speech correction candidate.

12. A machine readable storage, having stored thereon a computer program having a plurality of code sections for performing a speech correction method for correcting misrecognized text in a speech recognition application, said code sections executable by a machine for causing a machine to perform the steps of:
receiving audio speech input and speech-to-text converting said received audio speech input to speech recognized text;
detecting in said speech recognized text a first speech correction command for performing a correction operation on speech recognized text stored in a text buffer;
if a first speech correction command is not detected in said speech recognized text, adding said speech recognized text to said text buffer;
if a first speech correction command is detected in said speech recognized text, performing said detected speech correction command on speech recognized text stored in said text buffer;
responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;
receiving a second speech correction command, said second speech correction command indicating both preferred replacement text and a preference to replace said misrecognized text with said preferred replacement text in said text buffer; and,
responsive to receiving said second speech correction command, replacing said misrecognized text in said text buffer with said preferred replacement text.

13. A machine readable storage, having stored thereon a computer program having a plurality of code sections for performing a speech correction method for correcting misrecognized text in a speech recognition application, said code sections executable by a machine for causing a machine to perform the steps of:
receiving audio speech input and speech-to-text converting said received audio speech input to speech recognized text;
detecting in said speech recognized text a first speech correction command for performing a correction operation on speech recognized text stored in a text buffer;
if a first speech correction command is not detected in said speech recognized text, adding said speech recognized text to said text buffer;
if a first speech correction command is detected in said speech recognized text, performing said detected speech correction command on speech recognized text stored in said text buffer;
responsive to detecting said first speech correction command in said speech recognized text, said first speech correction command indicating a preference to correct misrecognized text in said text buffer, audibly playing a list of speech correction candidates, wherein each speech correction candidate in said list is statistically alternative recognized text to said audio speech input;
receiving a second speech correction command, said second speech correction command indicating a preference to replace said misrecognized text in said text buffer with spelled-out replacement text;
responsive to receiving said second speech correction command, accepting audibly spelled-out replacement text, said audibly spelled-out replacement text comprising a series of spoken alphanumeric characters;
speech-to-text converting said series of spoken alphanumeric characters, each speech-to-text converted alphanumeric character stored in a temporary buffer, and combining said speech-to-text converted alphanumeric characters into spelled out replacement text; and, replacing said misrecognized text in said text buffer with said spelled out replacement text.

14. The machine readable storage according to claim 13, further comprising the steps of:

detecting in said audibly spelled-out replacement text, a third speech correction command, said third speech correction command indicating a preference to delete a particular alphanumeric character stored in said temporary buffer; and, responsive to detecting said third speech correction command, deleting said particular alphanumeric character from said temporary buffer.

15. The machine readable storage according to claim 13, further comprising the steps of:

detecting in said audibly spelled-out replacement text, a third speech correction command, said third speech correction command indicating both a preferred replacement alphanumeric character and a preference to replace a particular alphanumeric character with said preferred replacement alphanumeric character in said temporary buffer; and, responsive to detecting said third speech correction command, replacing said particular alphanumeric character with said preferred alphanumeric character in said temporary buffer.

16. The machine readable storage according to claim 13, wherein said accepting step further comprises the step of:

prior to accepting audibly spelled out replacement text, playing a pre-stored set of instructions for providing said spelled out replacement text.

* * * * *